United States Patent [19]

Gaines

[11] 4,173,498

[45] Nov. 6, 1979

[54] HEAT GATHERING AND CONDUCTING DEVICE FOR THERMOCOUPLE SENSORS

[76] Inventor: Ray N. Gaines, P.O. Box 311, Crystal Lake, Ill. 60014

[21] Appl. No.: 890,266

[22] Filed: Mar. 27, 1978

[51] Int. Cl.$^2$ .......................................... H01L 35/28
[52] U.S. Cl. .................................. 136/217; 136/242; 431/350
[58] Field of Search .................. 136/217; 431/80, 350

[56] References Cited

U.S. PATENT DOCUMENTS

| 2,648,377 | 8/1953 | Bodey | 431/350 X |
| 2,670,394 | 2/1954 | West | 431/350 X |
| 3,056,450 | 10/1962 | Loveland et al. | 136/217 X |

Primary Examiner—Leland A. Sebastian

[57] ABSTRACT

The device is a metal coil, formed of high conductive material, and designed to fit on the pilot light thermocouple of gas fired appliances. Its purpose is to extend the sensitivity of the thermocouple, thus precluding erroneous gas shut off when air currents drift the pilot flame away from the thermocouple tube. This is accomplished by forming a heat gathering ring completely around the pilot flame and transmitting the heat directly to the thermocouple by conduction.

1 Claim, 4 Drawing Figures

HEAT GATHERING AND CONDUCTING DEVICE FOR THERMOCOUPLE SENSORS

BACKGROUND OF THE INVENTION

By means of this invention there has been provided a simple, easy to install, cure for pilot outage in gas fired appliances caused from wind currents and drafts that blow the pilot flame away from contact with the pilot thermocouple.

This problem manifests itself in the recreation vehicle industry (but is not limited thereto).

Installation of the device provides a heat (or flame) sensing ring to encircle the pilot tube thus permitting contact with the flame without regard to directional shift. The heat is then conducted directly to the thermocouple coil which is mounted directly over the thermocouple, thereby maintaining the heat transference required to normal operation of the thermocouple.

The device is relatively simple to fabricate and install.

The above features are objects of this invention and further objects will appear in the detailed description which follows and will otherwise be apparent to those skilled in the art.

For the purpose of this illustration of this invention, there is shown in the accompanying drawings, a preferred embodiment thereof. It is to be understood that these drawings are for the purpose of example only and that the invention is not limited thereto.

THE DISCLOSURE

Figure 1:
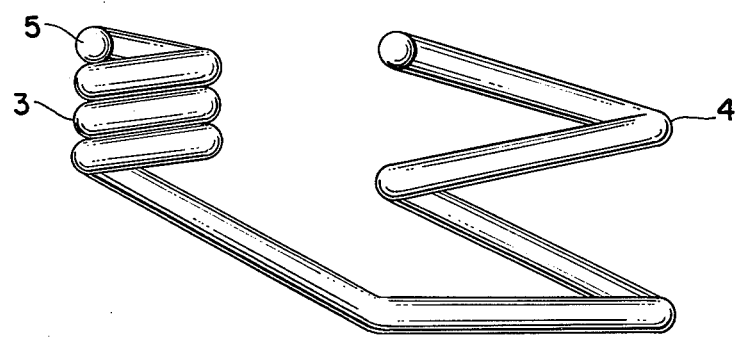
FIG. 1 is a view in side elevation.
Figure 2:
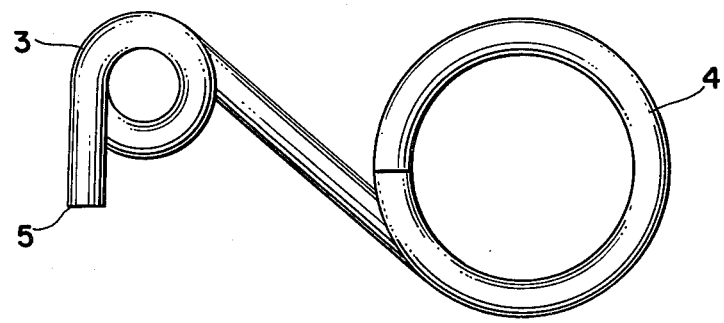
FIG. 2 is a view in vertical elevation viewed from the top.

The device is shown in FIGS. 1 and 2. It is comprised of pure copper wire formed into two coils. The smaller coil 3 is close wound with turns touching each other. The internal diameter of the coil is such as to permit the device to be slid over the end of a standard thermocouple. This coil is referred to as the conductive coil. The larger coil 4 is shaped with open turns approximately 0.500 diameter with 0.125 spacing between turns. This coil is referred to as the flame ring. The protrusion 5 at the base of the conductive coil 3 is an installation tab.

OPERATION

Figure 3:
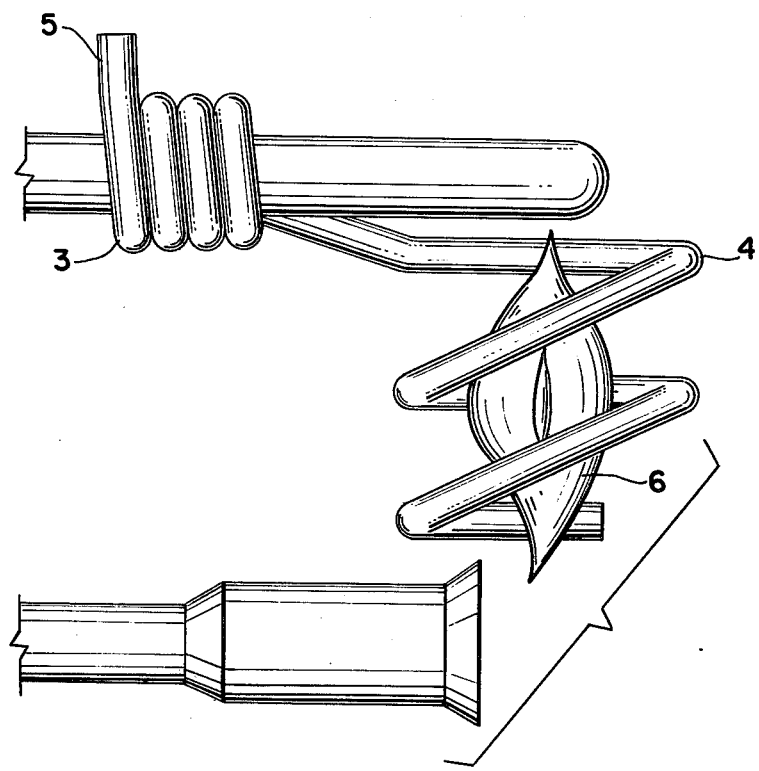
FIG. 3 is a view as installed on a typical pilot light mechanism.

The device is very simply installed by grasping the installation tab 5, FIGS. 1 and 2, and forcing the conductive coil 3 over the end of the thermocouple FIG. 3. The flame ring 4 is then positioned so as to surround the pilot flame 6. Presence of flame in any direction will permit heat transfer by conduction to the thermocouple tube.

Figure 4:
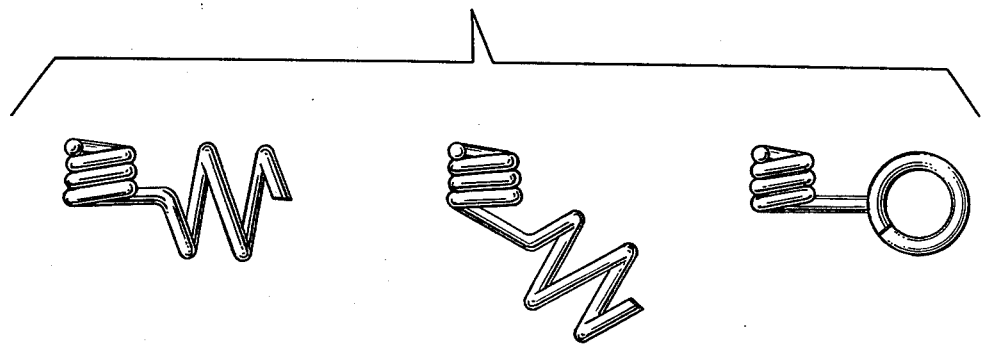
FIG. 4 is a view in side elevation showing some variations achieved by on site modification to adopt to variables.

FIG. 4 shows samples of modification made at time of installation to facilitate different appliance designs.

Various changes and modifications may be made within this invention as will be readily apparent to those skilled in the art.

What is claimed is:

1. A manufacture device to collect and transfer heat by conduction from a pilot flame to a thermocouple comprising in combination a standard thermocouple and wire or the like formed in two coils, the smaller coil close wound with turns touching each other with an internal diameter such as to permit the device to be slid over the end of a standard thermocouple and the larger coil with open turns to surround the pilot flame.

* * * * *